United States Patent
Inoue et al.

(10) Patent No.: US 6,510,023 B1
(45) Date of Patent: Jan. 21, 2003

(54) MAGNETIC HEAD FOR HIGH COERCIVE FORCE MAGNETIC RECORDING MEDIUM

(75) Inventors: Yoshihiko Inoue, Miyagi (JP); Junichi Honda, Miyagi (JP); Fusashige Tokutake, Miyagi (JP); Atsushi Suzuki, Miyagi (JP)

(73) Assignee: Sony Corporation, Tokyo (JP)

( * ) Notice: Subject to any disclaimer, the term of this patent is extended or adjusted under 35 U.S.C. 154(b) by 16 days.

(21) Appl. No.: 09/706,908

(22) Filed: Nov. 6, 2000

(30) Foreign Application Priority Data

Nov. 4, 1999 (JP) .......................................... 11-314290

(51) Int. Cl.[7] .............................................. G11B 5/147
(52) U.S. Cl. ....................................................... 360/126
(58) Field of Search ........................................ 360/126

(56) References Cited

U.S. PATENT DOCUMENTS 5,227,940 A * 7/1993 Isomura et al. ............. 360/126
5,432,645 A * 7/1995 Terunuma et al. .......... 360/126
5,873,955 A * 2/1999 Kirino et al. ................ 360/126
6,033,792 A * 3/2000 Kirino et al. ................ 360/126

* cited by examiner

Primary Examiner—Robert S. Tupper
(74) Attorney, Agent, or Firm—Sonnenschein, Nath & Rosenthal (57) ABSTRACT

A magnetic head forms a closed magnetic circuit with a magnetic core and has a gap in the closed magnetic circuit. At least a part of the magnetic core is composed of soft magnetic laminated films made by laminating soft magnetic thin film layers and noble metal layers. The soft magnetic thin film layers are exhibited by a composition formula of $Fe_a Si_b Ta_c Ru_d Ga_e N_f$ (where "a", "b", "c", "d", "e" and "f" in the formula indicate compositions of respective elements by the atomic percent), and ranges of the compositions are: 62 atomic percent $< a <$ 75 atomic percent; 7 atomic percent $< b <$ 18 atomic percent; 3 atomic percent $< c <$ 10 atomic percent; 0 atomic percent $\leq d <$ 10 atomic percent; 0 atomic percent $\leq e <$ 6 atomic percent; 5 atomic percent $< f <$ 12 atomic percent; and $b+c >$ 13 atomic percent. The noble metal layers contain at least a kind of Pt, Au, Ag and Pd.

12 Claims, 13 Drawing Sheets

| ATOMIC FRACTION OF SOFT MAGNETIC THIN FILM EXCLUDING NITROGEN | | | | | SOFT MAGNETIC CHARACTERISTIC | | |
|---|---|---|---|---|---|---|---|
| Fe (ATOMIC%) | Si (ATOMIC%) | Ta (ATOMIC%) | Ru (ATOMIC%) | Ga (ATOMIC%) | Hc (A/m) | Bs (T) | μHard (1MHz) |
| 73.6 | 13.1 | 9.5 | 3.0 | 0.8 | 8.1 | 1.22 | 3415 |
| 67.8 | 13.8 | 8.7 | 9.7 | 0.0 | 152.4 | 1.22 | 485 |
| 70.3 | 12.8 | 9.2 | 6.9 | 0.8 | 3.5 | 1.20 | 3725 |
| 69.0 | 10.8 | 9.0 | 11.0 | 0.2 | 9.4 | 1.16 | 3308 |
| 71.7 | 15.5 | 9.4 | 3.1 | 0.3 | 0.6 | 1.15 | 5070 |
| 69.7 | 12.4 | 9.2 | 8.7 | 0.0 | 3.9 | 1.22 | 3954 |
| 77.3 | 13.4 | 6.7 | 2.4 | 0.2 | 38.1 | 1.43 | 821 |
| 71.6 | 16.3 | 8.9 | 3.2 | 0.0 | 159.6 | 1.10 | 340 |
| 76.4 | 10.3 | 10.6 | 2.3 | 0.4 | 61.8 | 1.20 | 1733 |
| 75.3 | 8.2 | 14.5 | 2.0 | 0.0 | 6623.2 | 0.73 | 7 |
| 77.0 | 11.6 | 9.4 | 2.0 | 0.0 | 22.2 | 1.44 | 2581 |
| 80.9 | 8.0 | 9.4 | 1.7 | 0.0 | 234.0 | 1.52 | 367 |

FIG. 4

| ATOMIC FRACTION OF SOFT MAGNETIC THIN FILM EXCLUDING NITROGEN | | | | | SOFT MAGNETIC CHARACTERISTIC | | |
|---|---|---|---|---|---|---|---|
| Fe (ATOMIC%) | Si (ATOMIC%) | Ta (ATOMIC%) | Ru (ATOMIC%) | Ga (ATOMIC%) | Hc (A/m) | Bs (T) | μHard (1MHz) |
| 78.4 | 11.6 | 7.1 | 2.4 | 0.5 | 110.6 | 1.49 | 337 |
| 76.4 | 13.3 | 7.9 | 2.5 | 0.0 | 25.8 | 1.37 | 2673 |
| 76.1 | 10.5 | 7.6 | 5.8 | 0.0 | 32.6 | 1.40 | 1435 |
| 76.4 | 12.2 | 8.9 | 2.4 | 0.0 | 19.2 | 1.30 | 2399 |
| 78.0 | 7.6 | 9.7 | 4.7 | 0.0 | 21.9 | 1.34 | 2750 |
| 73.9 | 9.1 | 8.9 | 7.6 | 0.5 | 20.9 | 1.34 | 2073 |
| 83.0 | 8.7 | 6.1 | 2.2 | 0.0 | 1114.4 | 1.15 | 74 |
| 77.5 | 11.1 | 8.4 | 3.0 | 0.0 | 12.8 | 1.32 | 3440 |
| 73.0 | 17.5 | 6.8 | 2.7 | 0.0 | 41.3 | 1.36 | 451 |
| 70.9 | 18.1 | 7.7 | 3.3 | 0.0 | 16.4 | 1.25 | 1258 |
| 76.7 | 15.3 | 5.9 | 2.1 | 0.0 | 331.7 | 1.38 | 93 |
| 72.1 | 18.0 | 7.2 | 2.7 | 0.0 | 26.6 | 1.31 | 589 |

FIG. 5

| ATOMIC FRACTION OF SOFT MAGNETIC THIN FILM EXCLUDING NITROGEN | | | | | SOFT MAGNETIC CHARACTERISTIC | | |
|---|---|---|---|---|---|---|---|
| Fe (ATOMIC%) | Si (ATOMIC%) | Ta (ATOMIC%) | Ru (ATOMIC%) | Ga (ATOMIC%) | Hc (A/m) | Bs (T) | μHard (1MHz) |
| 74.7 | 16.8 | 6.1 | 2.4 | 0.0 | 63.3 | 1.42 | 302 |
| 70.5 | 14.3 | 2.3 | 7.6 | 5.3 | 52.7 | 1.27 | 1111 |
| 70.4 | 15.5 | 1.7 | 7.0 | 5.4 | 422.0 | 1.34 | 260 |
| 72.1 | 13.4 | 1.7 | 7.2 | 5.7 | 99.6 | 1.36 | 115 |
| 73.7 | 12.8 | 2.2 | 7.0 | 4.3 | 312.2 | 1.34 | 223 |
| 72.4 | 13.7 | 2.8 | 6.8 | 4.3 | 193.5 | 1.36 | 403 |
| 72.5 | 11.0 | 5.3 | 7.0 | 4.2 | 75.8 | 1.26 | 238 |
| 69.8 | 12.2 | 9.6 | 7.2 | 1.1 | 0.8 | 1.15 | 1983 |
| 71.0 | 10.8 | 9.3 | 6.8 | 2.1 | 2.3 | 1.19 | 1554 |
| 71.0 | 11.3 | 8.8 | 6.3 | 2.7 | 5.0 | 1.19 | 1449 |
| 70.8 | 9.8 | 9.4 | 6.9 | 3.1 | 1.2 | 1.15 | 2872 |
| 70.8 | 12.7 | 7.5 | 6.5 | 2.6 | 12.7 | 1.23 | 2633 |

FIG. 6

| ATOMIC FRACTION OF SOFT MAGNETIC THIN FILM EXCLUDING NITROGEN | | | | | SOFT MAGNETIC CHARACTERISTIC | | |
|---|---|---|---|---|---|---|---|
| Fe (ATOMIC%) | Si (ATOMIC%) | Ta (ATOMIC%) | Ru (ATOMIC%) | Ga (ATOMIC%) | Hc (A/m) | Bs (T) | μHard (1MHz) |
| 71.3 | 12.2 | 8.0 | 6.6 | 2.0 | 16.3 | 1.29 | 2263 |
| 74.5 | 9.4 | 8.7 | 6.3 | 1.1 | 10.6 | 1.26 | 3077 |
| 73.1 | 9.9 | 6.7 | 6.5 | 3.8 | 64.0 | 1.29 | 540 |
| 75.3 | 8.5 | 10.2 | 5.6 | 0.4 | 6.7 | 1.24 | 3410 |
| 72.5 | 11.9 | 9.8 | 5.1 | 0.8 | 7.5 | 1.25 | 3653 |
| 74.6 | 10.9 | 7.6 | 5.5 | 1.5 | 24.5 | 1.28 | 1107 |
| 76.4 | 9.4 | 8.1 | 5.0 | 1.0 | 12.6 | 1.31 | 1497 |
| 76.2 | 8.9 | 7.0 | 5.0 | 2.9 | 27.9 | 1.35 | 1091 |
| 75.7 | 10.8 | 8.3 | 4.7 | 0.4 | 12.8 | 1.35 | 1869 |
| 76.2 | 9.2 | 8.3 | 5.4 | 0.9 | 15.0 | 1.33 | 1638 |
| 73.5 | 12.1 | 8.6 | 4.6 | 1.1 | 10.8 | 1.28 | 1070 |
| 73.6 | 12.7 | 7.8 | 4.0 | 1.9 | 7.6 | 1.25 | 1073 |

MAGNETIC HEAD FOR HIGH COERCIVE FORCE MAGNETIC RECORDING MEDIUM

RELATED APPLICATION DATA

The present application claims priority to Japanese Application No. P11-314290 filed Nov. 4, 1999, which application is incorporated herein by reference to the extent permitted by law.

BACKGROUND OF THE INVENTION

1. Field of the Invention

The present invention relates to a magnetic head for performing recording to and reproduction from a high coercive force magnetic recording medium such as a so-called metal evaporated tape or the like.

2. Description of the Related Art

Recently, a signal has come to be recorded in a high density in a field of magnetic recording. For realizing the high density recording, there a magnetic recording medium having a high coercive force and a high residual magnetic flux density such as the so-called metal evaporated tape made by affixing a ferromagnetic metal material on a non-magnetic base directly has been in practical use.

With the change of the magnetic recording medium, a core material of a magnetic head is demanded to have a high saturation magnetic flux density and a high permeability.

For meeting such a demand, there has conventionally been proposed a so-called metal-in-gap (MIG) type magnetic head using ferrite as an auxiliary core material and forming metal magnetic thin films having a high saturation magnetic flux density on the ferrite as main core materials for forming the gap portion thereof with the metal magnetic thin films. The MIG type magnetic head is suitable for recording to and reproduction from the metal evaporated tape.

Incidentally, because there is a demand for such a kind of the magnetic head to perform well its recording and reproducing operations to a magnetic recording medium having a high coercive force such as the above described metal evaporated tape as the change of the recording density to be higher has remarkably progressed in recent years, there is sought a metal magnetic material that has a higher saturation magnetic flux density for ensuring a sufficient recording magnetic field and that has a superior soft magnetic characteristic even in a high frequency region.

In such a situation, because a fine crystal metal soft magnetic thin film, the main component of which is Fe, has a high saturation magnetic flux density and exhibits a superior soft magnetic characteristic, the fine crystal metal soft magnetic thin film begins to be put into practical use in place of the conventional metal magnetic material for a magnetic head.

However, because the above described Fe-base fine crystal metal soft magnetic thin film has a structure that almost all of the volume of the thin film is occupied by a fine crystal having a composition near to pure iron, the thin film has a problem that the corrosion resistance thereof is generally low and thereby the reliability of a device using the film is lowered.

Furthermore, the soft magnetic characteristic of the MIG type magnetic head using the Fe-base fine crystal metal soft magnetic thin film in a direction parallel to the surface of the film is superior, but the soft magnetic characteristic thereof in the thickness direction of the film is inferior. That is, the permeability thereof in the thickness direction of the film becomes lowered, and thereby the whole soft magnetic characteristic of the Fe-base fine crystal metal soft magnetic thin film is lowered. In other words, the intrinsic reproducing characteristic of the MIG type magnetic head using the Fe-base fine crystal metallic soft magnetic thin film is not brought into full play.

SUMMARY OF THE INVENTION

Accordingly, the present invention is proposed on the basis of the actual circumstances of the prior art, and aims to provide a magnetic head having a high saturation magnetic flux density and superior in the corrosion resistance, and further having a superior soft magnetic characteristic and a reproducing characteristic.

For attaining the aforesaid object, according to an aspect of the present invention there is provided a magnetic head a magnetic core of which forms a closed magnetic circuit and which has a gap in the closed magnetic circuit, wherein: at least a part of the magnetic core is composed of a soft magnetic laminated film made by laminating a soft magnetic thin film layer and a noble metal layer, and the soft magnetic thin film layer is exhibited by a composition formula of $Fe_a Si_b Ta_c Ru_d Ga_e N_f$ (where "a", "b", "c", "d", "e" and "f" in the formula indicate compositions of respective elements by the atomic percent), and ranges of the compositions are:

62 atomic percent$<a<$75 atomic percent;
7 atomic percent$<b<$18 atomic percent;
3 atomic percent$<c<$10 atomic percent;
0 atomic percent$\leq d<$10 atomic percent;
0 atomic percent$\leq e<$6 atomic percent;
5 atomic percent$<f<$12 atomic percent; and
b+c$>$13 atomic percent, and the noble metal layer contains at least a kind of Pt, Au, Ag and Pd.

Because, in the thus constructed magnetic head, the soft magnetic thin film layer is a fine crystal deposition type soft magnetic thin film, the high saturation magnetic flux density and the superior soft magnetic characteristic are realized. And further, because a part which constitutes a core is replaced by a Fe—Ru—Ga—Si alloy, a superior corrosion resistance performance can also be realized. In addition, because the soft magnetic laminated film is made by laminating the soft magnetic thin film layer and the noble metal layer, an α-Fe (110) orientation is produced after heat treatment. Consequently, a superior soft magnetic characteristic is realized together with a great improvement of the permeability in the film thickness direction thereof.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Hereafter, drawings are referred while detailed descriptions are given to a concrete embodiment of a magnetic head according to the present invention.

Figure 1:
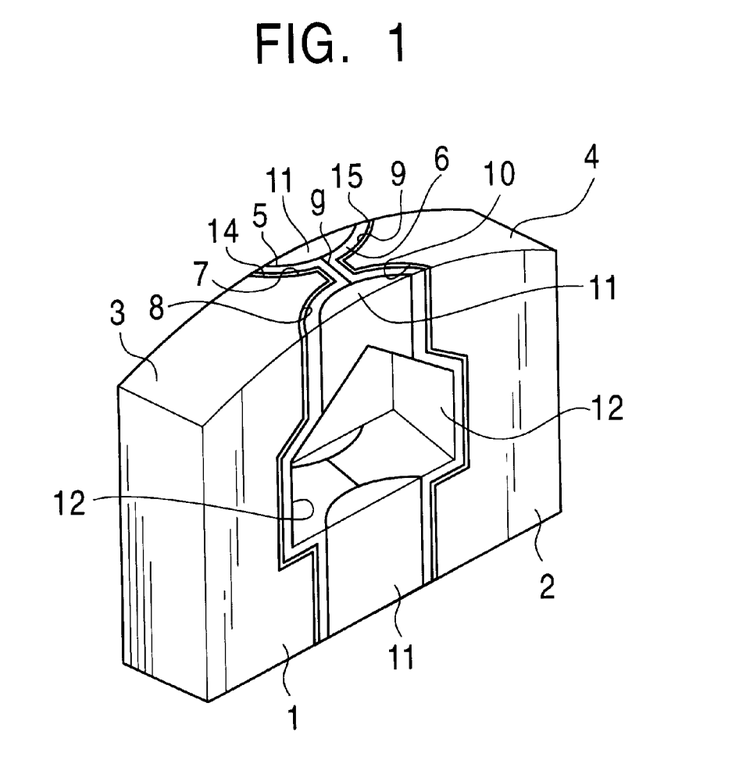
FIG. 1 is a schematic perspective view showing an example of the structure of a MIG type magnetic head of an embodiment according to the present invention.
Figure 2:
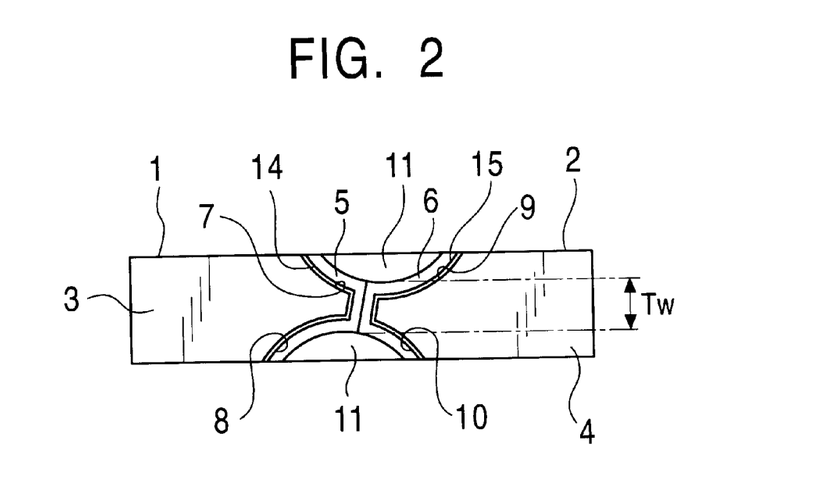
FIG. 2 is a schematic top view showing a surface, which slides on a magnetic recording medium, of the MIG type magnetic head shown in FIG. 1.

As shown in FIGS. 1 and 2, the magnetic head of the embodiment is made by joining a pair of half bodies 1 and 2 of a magnetic core, which are made separately as a left side part and a right side part of a magnetic gap "g" disposed substantially at a center position of a surface of the magnetic head contacting with a magnetic recording medium, to be composed in a body.

The half bodies 1 and 2 of the magnetic core are composed of substrates 3 and 4, which are auxiliary cores, and soft magnetic laminated films 5 and 6, which are main core portions.

The substrates 3 and 4 are made from an oxide magnetic material such as Mn—Zn-based ferrite or Ni-Zn-based ferrite, and perform the auxiliary core function for forming a closed magnetic circuit together with the soft magnetic laminated films 5 and 6.

Arc-like track width restricting grooves 7–10 for restricting a track width Tw of the magnetic gap "g" are vertically, i.e., in a depth direction, formed from vicinity portions of the both edges of the magnetic gap "g" on the surfaces opposed to the magnetic gap forming surfaces of the substrates 3 and 4.

Incidentally, a non-magnetic material 11 such as glass is filled up in the respective track width restricting grooves 7–10 for ensuring the touching characteristic to the magnetic recording medium and for preventing inclined abrasion owing to the slide on the magnetic medium.

Furthermore, a winding groove 12 having a side face shape of a substantial rectangle is formed on a surface opposed to the magnetic gap forming surface of one of the substrates 3 and 4 (substrate 4 in this embodiment) for restricting the depth of the magnetic gap "g" and for winding a coil, not shown, thereon. Incidentally, the winding groove 12 may be formed on the other substrate 4 as well as the substrate 3.

On the other hand, the soft magnetic laminated films 5 and 6 perform the main core function for forming the closed magnetic circuit together with the substrates 3 and 4. The soft magnetic laminated films 5 and 6 are formed on the surfaces of the substrates 3 and 4 opposed to each other from a front gap part to a back gap part. Consequently, these surfaces formed by the soft magnetic laminated films 5 and 6 become the magnetic gap forming surfaces of the magnetic core half bodies 1 and 2.

Incidentally, in the embodiment, the soft magnetic laminated films 5 and 6 are formed not only on the surfaces of the substrates 3 and 4 opposed to each other but also inside the track width restricting grooves 7–10. Moreover, the soft magnetic laminated films 5 and 6 may be formed on the whole inner surface of the winding groove 12 or at least a part of the inner surface.

Now, in the embodiment, the soft magnetic laminated films 5 and 6 have a structure made by laminating soft magnetic thin film layers and noble metal layers.

Main component elements of the soft magnetic thin film layers are Fe, Si, Ta, Ru, Ga and N. When the compositions of the soft magnetic thin film layers are expressed by a composition formula of $Fe_aSi_bTa_cRu_dGa_eN_f$ (where "a", "b", "c", "d", "e" and "f" in the formula indicate compositions of respective elements by the atomic percent), ranges of the compositions are:

62 atomic percent<a<75 atomic percent;
7 atomic percent<b<18 atomic percent;
3 atomic percent<c<10 atomic percent;
0 atomic percent≦d<10 atomic percent;
0 atomic percent≦e<6 atomic percent;
5 atomic percent<f<12 atomic percent; and
b+c>13 atomic percent.

The soft magnetic thin film layers of the present invention are made by performing RF or DC magnetron sputtering to a target having the same composition as the aforesaid compositions except for nitrogen in an atmosphere of an argon gas containing nitrogen of 5–20 mol percent. The soft magnetic thin film layers develop their soft magnetic characteristics by receiving heat treatment of 450° C. to 600° C.

There are shown in FIGS. 3–6 compositions excluding nitrogen of soft magnetic thin film layers, which were actually made by executing RF magnetron spattering in the atmosphere of the argon gas containing nitrogen of 10 mol percent, and coercive forces Hc, saturation magnetic flux densities Bs and permeabilities $\mu_{Hard}$ in directions of a hard axis of magnetization of the soft magnetic thin film layers after holding them at 550° C. for one hour.

Figure 3:
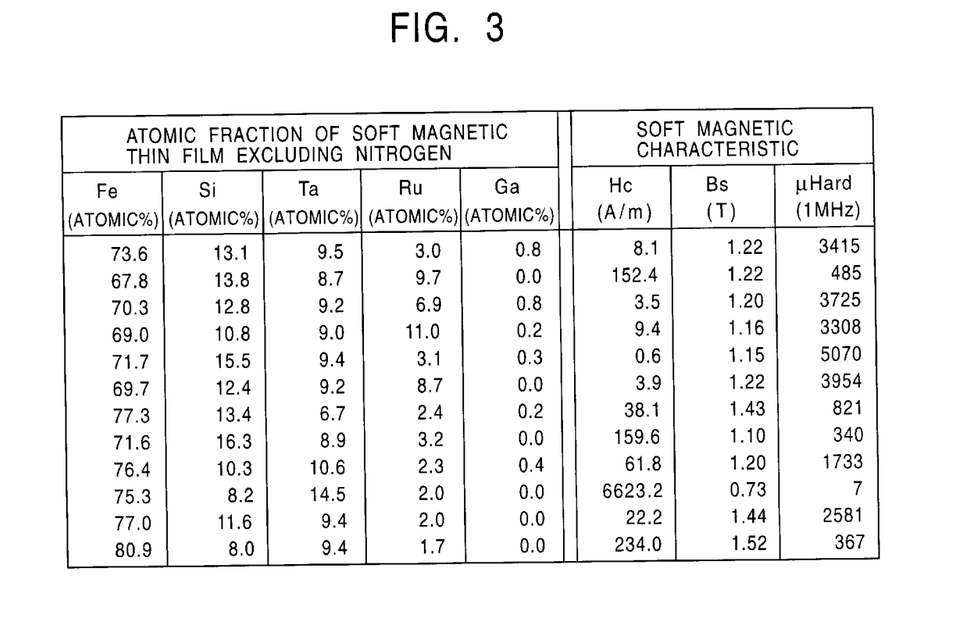
FIG. 3 is a table showing compositions, from which nitrogen is excluded, of soft magnetic thin films according to the present invention and their soft agnetic characteristics after holding them at 550° C. for one hour.
Figure 4:
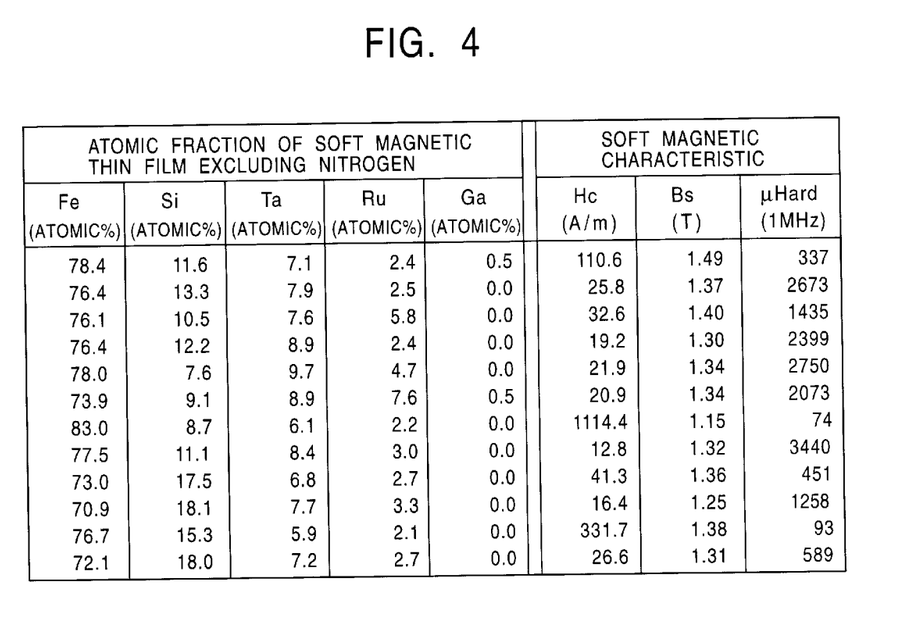
FIG. 4 is a table showing compositions, from which nitrogen is excluded, of soft magnetic thin films according to the present invention and their soft magnetic characteristics after holding them at 550° C. for one hour.
Figure 5:
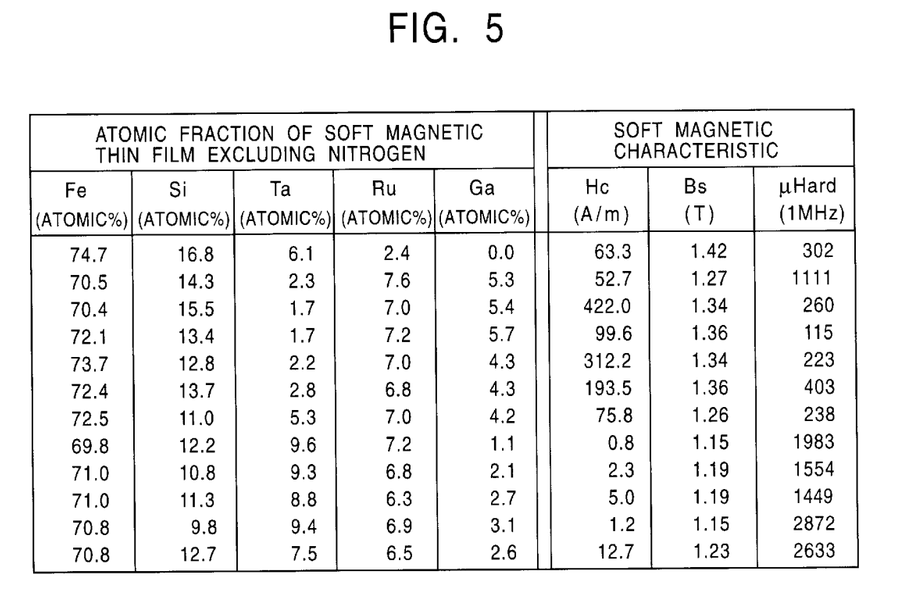
FIG. 5 is a table showing compositions, from which nitrogen is excluded, of soft magnetic thin films according to the present invention and their soft magnetic characteristics after holding them at 550° C. for one hour.
Figure 6:
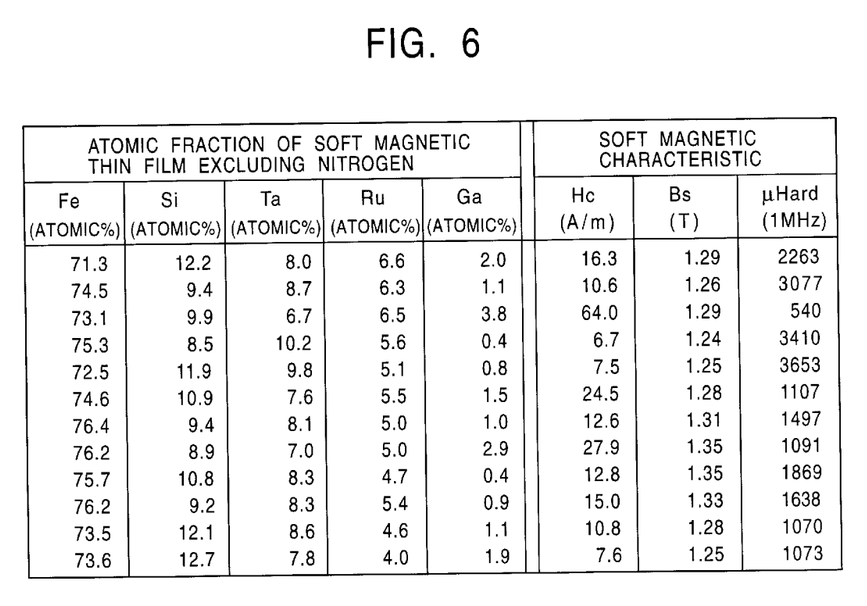
FIG. 6 is a table showing compositions, from which nitrogen is excluded, of soft magnetic thin films according to the present invention and their soft magnetic characteristics after holding them at 550° C. for one hour.
Figure 7:
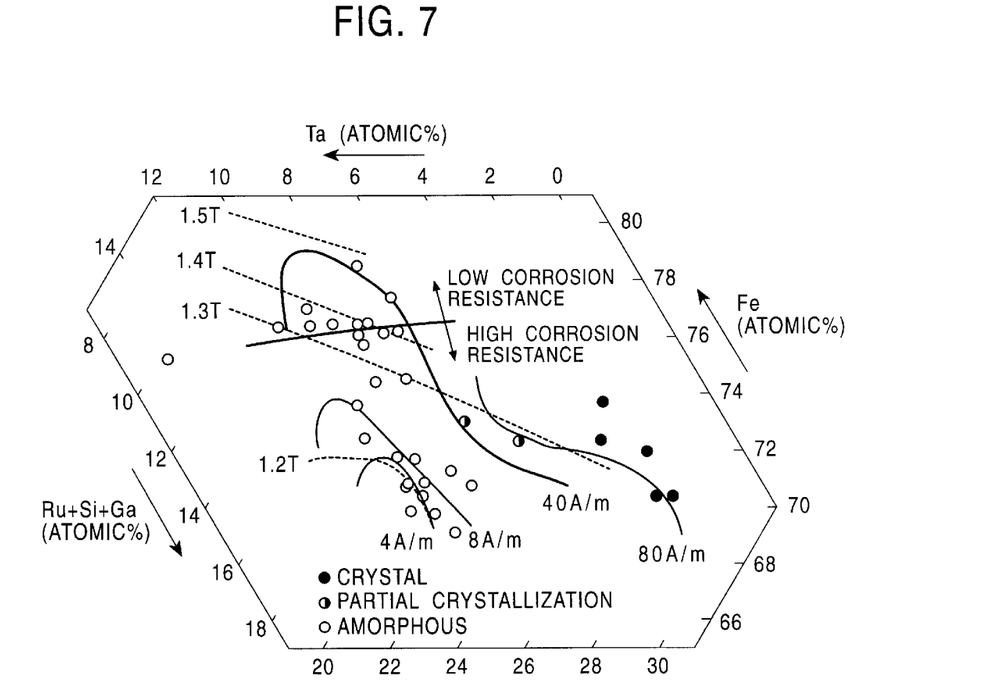
FIG. 7 is a characteristic diagram showing a distribution of magnetic characteristics in a threefactor composition diagram of Fe—Ta—(Ru+Si+Ga) concerning the data shown in FIG. 3.

Moreover, a figure showing a distribution in a composition map of the data shown in FIG. 3 distributed in conformity with atomic fractions of Fe and Ta is attached as FIG. 7.

Incidentally, the reason why composition fractions of the soft magnetic thin film layers are exhibited by means of the composition fractions excluding nitrogen is that the accuracy of analysis of nitrogen which is one of light elements is inferior to that of the other elements. Hereafter, expressions of compositions are made so that sums of atomic fractions of component elements excluding nitrogen become 100 percent.

In all of the compositions, atomic fractions of nitrogen which can obtain the soft magnetic characteristic are within a range of 5 to 12 percent of each composition.

As apparent from FIG. 7, a composition range exhibiting good soft magnetic characteristics where coercive forces of soft magnetic thin films are 40 A/m or less exists in a region where atomic fractions of Ta are 5% to 7% or more. Ta is known to be an element accelerating the change of a film to be amorphous at the time of forming the film. The reason why good soft magnetic characteristics cannot obtain in regions where atomic fractions of Ta are 5% to 7% or less is considered that amorphous structures before heat treatment that are necessary for the fine crystal deposition type soft magnetic thin film layers are not formed in this area.

Figure 8:
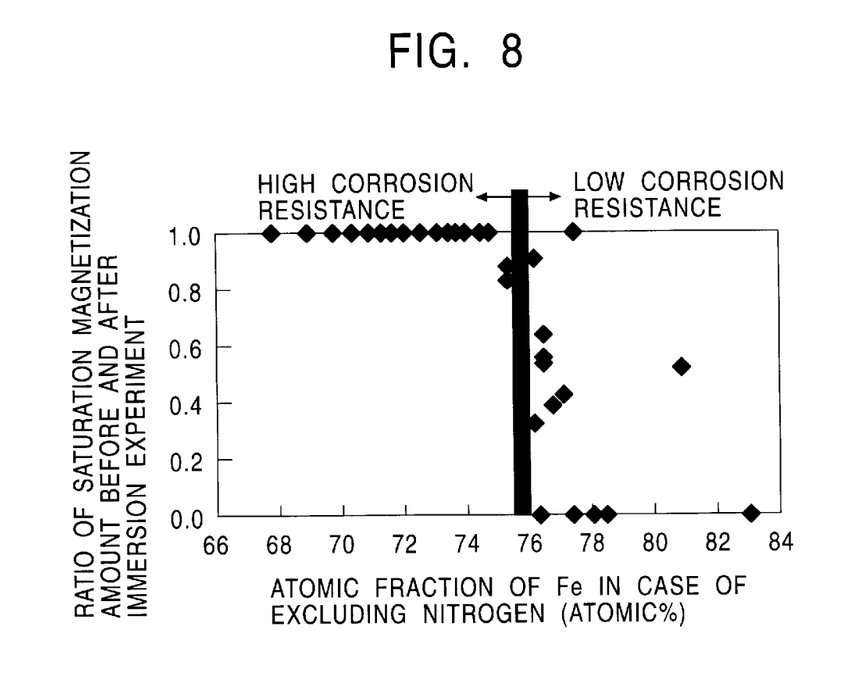
FIG. 8 is a characteristic diagram showing relationships between atomic fractions of Fe and corrosion resistances of magnetic thin films shown in FIGS. 3–6.

Moreover, FIG. 8 shows graphs of ratios of saturation magnetization amounts of all of the magnetic thin films shown in FIGS. 3–6 before and after the immersion of them into NaCl water solutions of a 0.5 normal concentration for 200 hours. The graphs are plotted to atomic fractions of Fe.

FIG. 8 shows that magnetic thin films the ratios of the saturation magnetization amounts of which are one do not corrode at all and that the degree of corrosion becomes larger as the ratio comes to be nearer to zero.

It can be known from FIG. 7 that a higher saturation magnetic flux density Bs can be obtained as the atomic fraction of Fe becomes higher, however it is also known from FIG. 8 that corrosion resistances begin to be inferior from a region where the atomic fraction of Fe exceeds 76 percent in a case where a sum of atomic fractions of component elements excluding nitrogen is made to be 100 percent.

Figure 9A:
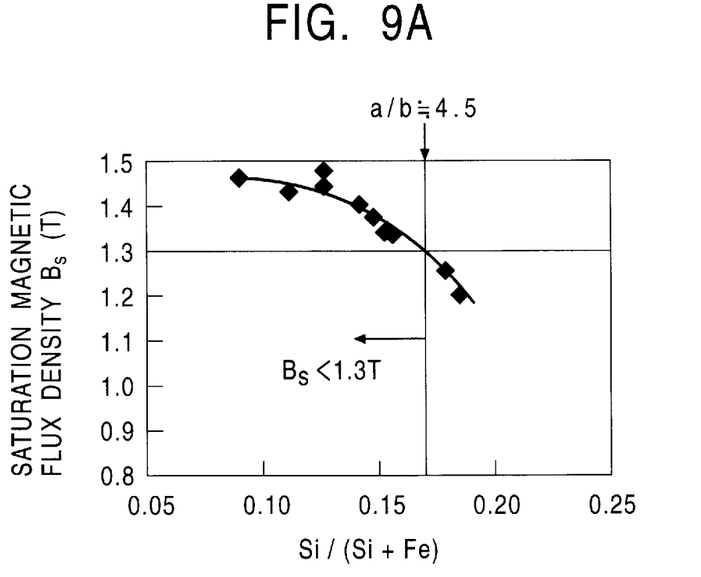
FIG. 9A is a characteristic diagram showing a relationship between saturation magnetic flux densities Bs and Si/(Si+Fe) of magnetic thin films shown in FIGS. 3–6.
Figure 9B:
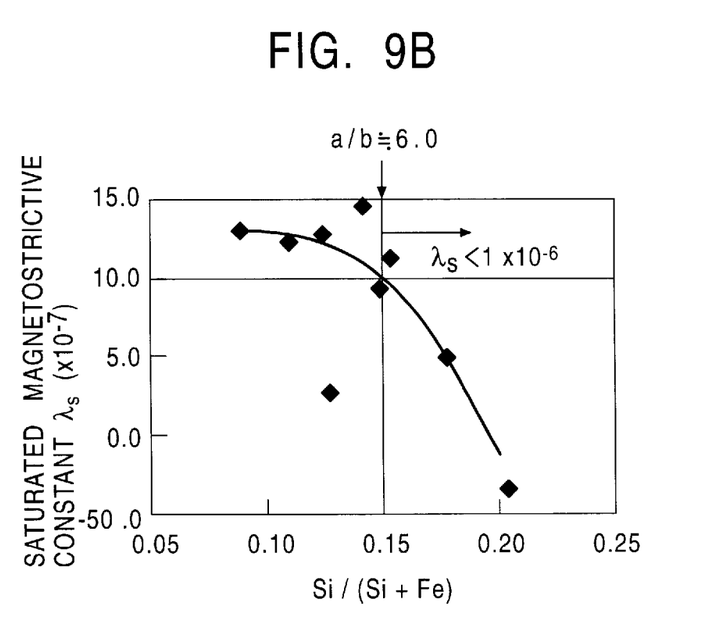
FIG. 9B is a characteristic diagram showing a relationship between saturated magnetostrictive constants λs and Si/(Si+Fe) of magnetic thin films shown in FIGS. 3–6.

Moreover, FIG. 9A and FIG. 9B show changes of saturation magnetic flux densities and saturated magnetostrictive constants of magnetic thin films in accordance with the ratios of atomic fractions of Si to sums of atomic fractions of Si and Fe.

Soft magnetic characteristics of Hc<80 A/m can be obtained in a range of the ratios of Si/(Si+Fe) being 0.1 to 0.21. However, the inventors found that it is more desirable that the ratios are within a range of 0.15 to 0.17 so that the saturation magnetic flux density of the magnetic thin film is 1.3 T or more and that the saturated magnetostrictive constant of the magnetic thin film is $1 \times 10^{-6}$ or less.

The aforesaid desirable ratios can be rephrased that "a" and "b" in the composition formula of $Fe_aSi_bTa_cRu_dGa_eN_f$ are within a range of about 4.5<a/b<6.0.

Moreover, because Si is an element contributing to the formation of an amorphous structure before heat treatment similarly to Ta, the influence of decreasing the atomic fraction of Ta can be cancelled by increasing the atomic fraction of Si to a certain extent.

The saturation magnetic flux density Bs of the magnetic thin film is lowered a little when the amount of addition of Ru to the composition of the magnetic thin film is increased. In addition, the addition of Ru is effective for improving the corrosion resistance of the magnetic thin film. Soft magnetic characteristics, coercive forces in which are less than 80 A/m, can be obtained in a wide range of the atomic fractions of 0 to 11 atomic percent as shown in FIG. 3. However, it is preferable that the atomic fractions are 5 atomic percent or less for obtaining a higher saturation magnetic flux density.

Ga is an element contributing to the decrease in the magnetic anisotropy of soft magnetic thin film layers and the improvement of their corrosion resistances. Soft magnetic characteristics, coercive forces in which are less than 80 A/m, can be obtained in a range of the atomic fractions of 0 to 5 atomic percent as shown in FIG. 3. However, it is preferable that the atomic fractions are 3 atomic percent or less for obtaining a higher saturation magnetic flux density.

From the results obtained by the examinations described above, it can be said that it is preferable that, when the soft magnetic thin film layer is exhibited by a composition formula of $Fe_aSi_bTa_cRu_dGa_eN_f$ (where "a", "b", "c", "d", "e" and "f" in the formula indicate compositions of respective elements by the atomic percent), ranges of the composition of the soft magnetic thin film layer are:

62 atomic percent<a<75 atomic percent;
7 atomic percent<b<18 atomic percent;
3 atomic percent<c<10 atomic percent;
0 atomic percent≦d<10 atomic percent;
0 atomic percent≦e<6 atomic percent;
5 atomic percent<f<12 atomic percent; and
b+c>13 atomic percent.

Furthermore, taking into account of application to the magnetic head and the like, it is more preferable that each atomic fraction of the composition is:

65 atomic percent<a<70 atomic percent;
10 atomic percent<b<16 atomic percent;
5 atomic percent<c<9 atomic percent;
0 atomic percent≦d<5 atomic percent;
0 atomic percent≦e<3 atomic percent;
5 atomic percent<f<12 atomic percent; and
4.5<a/b<6.

Moreover, if for example Hf is added to the composition as an element other than Fe, Si, Ta, Ru, Ga and N, the added Hf shows the same effect as that of Ta element forming a grain boundary phase of fine crystal grains in the magnetic thin film. Furthermore, if elements such as Al, Cr, Ti and Co are added to the composition, such elements are dissolved into the fine crystal grains in a state of solid solution. Thereby the elements develop effects such as the decrease in the magnetic anisotropy of soft magnetic thin film layers and the improvement of their corrosion resistances similarly to Ga. Accordingly, if about 0 to 6 atomic percent of at least one kind of metal elements of Al, Cr, Ti, Co and Hf are added to the soft magnetic thin film layers according to the present invention, substantially the same soft magnetic characteristics and corrosion resistances of the soft magnetic thin film layers as those of the case of the composition without any additional element can be obtained.

A noble metal layer of the soft magnetic laminated films 5 and 6 contain at least one kind of Pt, Au, Ag and Pd.

Incidentally, the soft magnetic laminated films 5 and 6 are multilayer films made by laminating the soft magnetic thin film layers and the noble metal layers by turns. In this case, if the soft magnetic laminated films 5 and 6 are directly formed on the substrates 3 and 4, respectively, diffusion reactions are caused between the ferrite constituting the substrates 3 and 4 and the soft magnetic laminated films 5 and 6. Thereby a pseud-gap is produced. Accordingly, it is preferable that a reaction preventing film is put between the soft magnetic laminated films 5 and 6 and the substrates 3 and 4.

Figure 10:
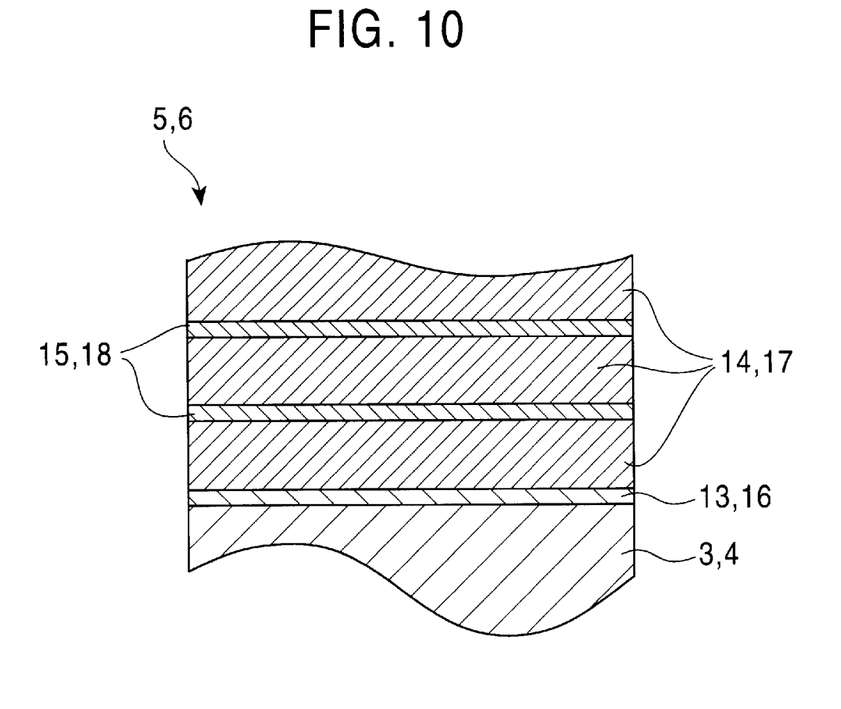
FIG. 10 is a schematic cross sectional view showing a main part of an example of a soft magnetic laminated film according to the present invention.

For example, as shown in FIG. 10, the soft magnetic laminated film 5 formed on the substrate 3 is formed by laminating soft magnetic thin film layers 14 and noble metal layers 15 by turns in this order on a reaction preventing film 13. The noble metal layer 15 may be used as the reaction preventing film 13 in this case.

Moreover, for example, contrary to the order shown in FIG. 10, the soft magnetic laminated film 5 may be formed by laminating the noble metal layers 15 and the soft magnetic thin film layers 14 by turns in this order on the reaction preventing film 13.

The top layer of the multilayer films composing the soft magnetic laminated film 5 may be either of the soft magnetic thin film layer 14 and the noble metal layer 15.

Incidentally, a reaction preventing film 16, the soft magnetic laminated film 6, and soft magnetic thin film layers 17 and noble metal layers 18 composing the soft magnetic laminated film 6, each formed on the substrate 4, can be formed in the same order as that of the reaction preventing film 13 and the soft magnetic laminated film 5 formed on the substrate 3.

The soft magnetic thin film layers 14 and 17 are in amorphous state immediately after being formed, but are changed to be in finely crystallized state after heat treatment. That is, in the soft magnetic laminated films 5 and 6, strong α-Fe (110) orientations are caused after heat treatment owing to alternate lamination of the soft magnetic thin film layers 14 and 17 and the noble metal layers 15 and 18. Consequently, the evenness of the magnetic fields of the soft magnetic laminated films 5 and 6 is increased, and thereby the soft magnetic characteristics of the soft magnetic laminated films 5 and 6 are improved. Such orientations have a tendency of being dispersed with the increase of the film thickness of the soft magnetic thin film layers 14 and 17. However, by increasing the number of layers of the noble metal layers 15 and 18 and by thinning the film thickness of the soft magnetic thin film layers 14 and 17 in some degree, the dominant orientations of the noble metal layers 15 and 18 governs the whole soft magnetic laminated films 5 and 6.

Moreover, because the soft magnetic thin film layers 14 and 17 and the noble metal layers 15 and 18 are alternately laminated in the soft magnetic laminated films 5 and 6, Fe-noble metal compounds are produced in the soft magnetic laminated films 5 and 6. Consequently, magnetically hard portions are produced in the soft magnetic laminated films 5 and 6. Because these portions perform a function of preventing the movement of magnetic domains, the rotated magnetization of the soft magnetic laminated films 5 and 6 is promoted, which results in increasing of the permeabilities of high frequency regions.

The film thickness of each layer of the soft magnetic thin film layers 14 and 17 is preferably within a range of 0.05 $\mu$m to 1 $\mu$m for obtaining sufficient advantages brought by the lamination of the noble metal layers 15 and 18. If the thickness of each layer of the soft magnetic thin film layers 14 and 17 is less than 0.5 $\mu$m, steps required for forming films such as sputtering for obtaining the sum of the film thickness of about 3 $\mu$m to 6 $\mu$m, which is the practical film thickness of the soft magnetic laminated films 5 and 6, are increased, and productivity of the soft magnetic thin film layers 14 and 17 becomes inferior together with the increase of the number of the layers of the noble metal layers 15 and 18. Consequently, there is an apprehension that the effective saturation magnetic flux densities of the soft magnetic laminated films 5 and 6 decrease. On the other hand, if the film thickness of each layer of the soft magnetic thin film layers 14 and 17 is over 1 $\mu$m, there is an apprehension that the advantages of laminating the noble metal layers 15 and 18 becomes reduced.

The film thickness of each layer of the noble metal layers 15 and 18 is preferable to be within a range of 0.3 nm to 10 nm for obtaining the full advantages developed by laminating the noble metal layers 15 and 18. If the film thickness of each layer of the noble metal layers 15 and 18 is less than 0.3 nm, there is an apprehension that the advantages of laminating the noble metal layers 15 and 18 cannot be derived. On the other hand, if the film thickness of each layer of the noble metal layers 15 and 18 is over 10 nm, there is an apprehension that the noble metal layers 15 and 18 act as a pseud-gap to produce undulations in the reproduction output characteristic of the soft magnetic laminated films 5 and 6.

By defining the film thickness of each layer of the soft magnetic thin film layers 14 and 17 and the noble metal layers 15 and 18 to the aforementioned ranges, occupation ratios of the noble metal layers in the soft magnetic laminated films 5 and 6 can be suppressed to an appropriate degree, and thereby a decline in the effectual saturation magnetic flux densities of the films 5 and 6 can be made to be very small. Moreover, although the noble metal layers 15 and 18 are disposed in parallel to the magnetic gap "g", the layers 15 and 18 do not act as a pseud-gap.

As a method for making the films of the soft magnetic thin film layers 14 and 17 and the noble metal layers 15 and 18, any of vacuum thin film forming techniques represented by a vacuum evaporation method, a sputtering method, an ion plating method and the like can be applied. In such a method, an increase of the number of sputtering steps can by resolved by changing an apparatus for performing such a method to one having multi-targets.

Next, there were evaluated recording and reproduction characteristics and corrosion resistances of the soft magnetic thin film layers 14 and 17 that were expressed in the above-described composition formula of $Fe_aSi_bTa_cRu_d$-$Ga_eN_f$ and were used in a state of being a single layer as the main core portions of the MIG type magnetic head.

The soft magnetic thin film layers 14 and 17 used in these evaluations were made by performing DC magnetron sputtering to a target composed of 74.0 atomic percent Fe, 15.0 atomic percent Si, 2.5 atomic percent Ru, 1.0 atomic percent Ga and 7.5 atomic percent Ta in the atmosphere of the argon gas containing nitrogen of 10 mol percent. The coercive forces Hc of the produced soft magnetic thin film layers were 15 A/m, and their saturation magnetic flux densities Bs were 1.35 T, and further permeabilities $\mu_{Hard}$ of the directions of the hard axis of magnetization were 3,200. If the soft magnetic thin film layers 14 and 17 are formed directly on the substrates 3 and 4 in this case, diffusion reactions between the ferrite of the substrates 3 and 4 and the magnetic thin film layers are caused to produce a pseud-gap. Accordingly, it is preferable to form the soft magnetic thin film layers 14 and 17 on the substrates 3 and 4 with the reaction preventing films 13 and 16 between the thin film layers 14 and 17 and the substrates 3 and 4.

Moreover, for comparison, two types of MIG type magnetic heads were made, and their recording and reproduction characteristics were compared with those of the aforesaid MIG type magnetic head. One of the newly made MIG type magnetic heads used fine crystal deposition type soft magnetic thin films (Hc=15 A/m, Bs=1.6 T, $\mu_{Hard}$=4,500) having a composition of 78 atomic percent Fe, 10 atomic percent Ta and 12 atomic percent N as the soft magnetic thin film layers. The other of the newly made MIG type magnetic heads used crystalline type soft magnetic thin films (Hc=25

A/m, Bs=1.1 T, $\mu_{Hard}$=1,500) having a composition of 66 atomic percent Fe, 14 atomic percent Si, 8 atomic percent Ru and 12 atomic percent Ga as the soft magnetic thin film layers.

Figure 11:
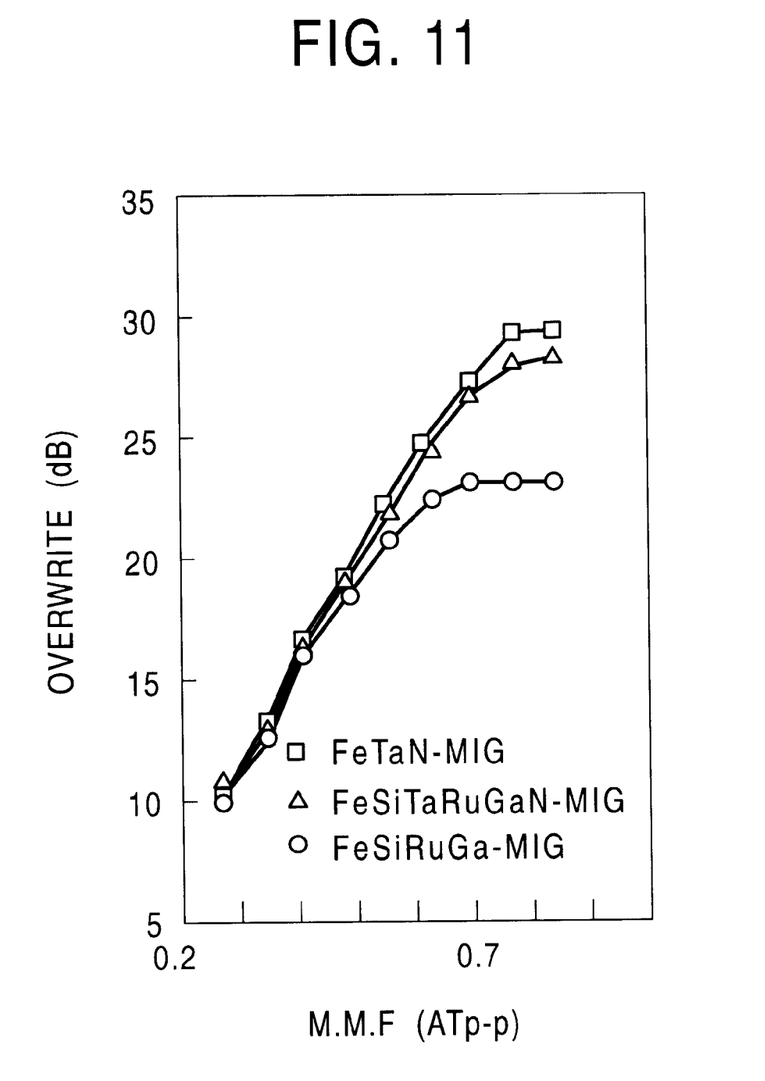
FIG. 11 is a characteristic diagram showing differences of overwrite characteristics of MIG type magnetic heads using various soft magnetic thin films according to the present invention.
Figure 12:
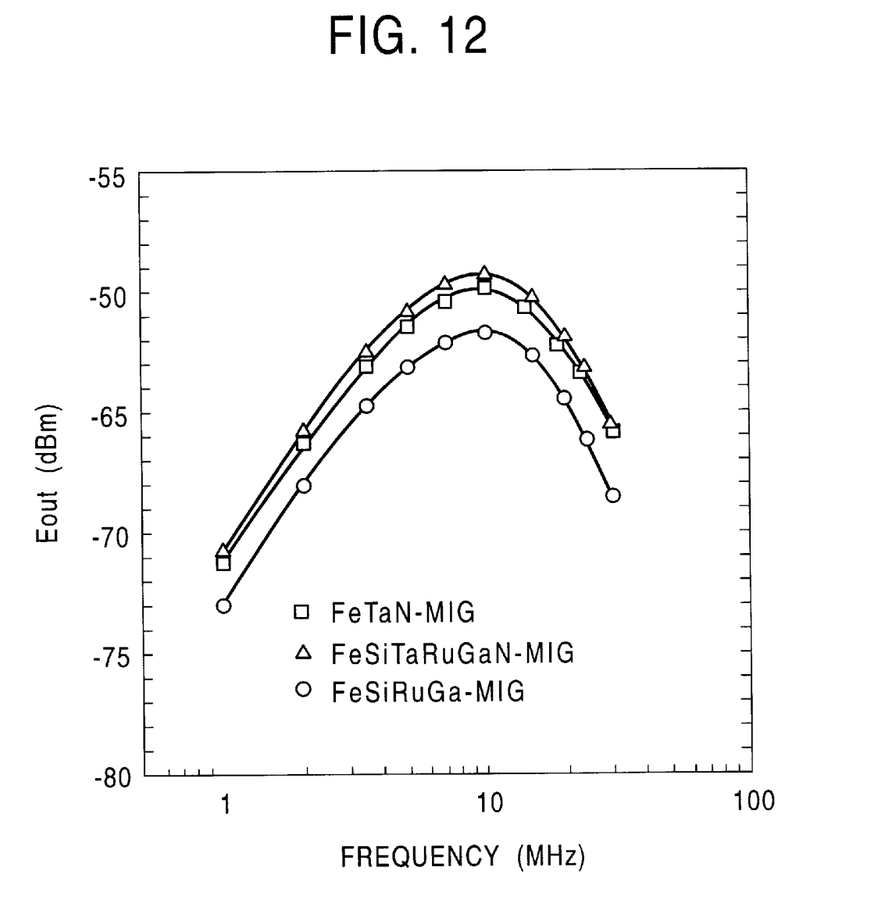
FIG. 12 is a characteristic diagram showing differences of frequency characteristics of reproduction outputs of MIG type magnetic heads using various soft magnetic thin films according to the present invention.

FIG. 11 shows results of overwrite characteristics of the three kinds of the MIG type magnetic heads measured by using a magnetic recording medium having a coercive force Hc of 132 KA/m and a thickness of magnetic layers of 0.53 $\mu$m. Moreover, FIG. 12 shows measurement results the frequency dependencies of the reproduction outputs of the three kinds of the MIG type magnetic heads.

The MIG type magnetic head using the aforesaid soft magnetic thin film layers 14 and 17 has superior overwrite characteristics that reflect high saturation magnetic flux densities of the employed soft magnetic thin film layers 14 and 17 in comparison with the MIG type magnetic head using crystalline soft magnetic thin films. In addition, the MIG type magnetic head using the soft magnetic thin film layers 14 and 17 shows high reproduction output levels, too, over the whole frequency width, which reflect good soft magnetic characteristics of the soft magnetic thin film layers 14 and 17. Consequently, it is known that MIG type magnetic head using the aforesaid soft magnetic thin film layers 14 and 17 shows recording and reproduction characteristics almost the same as those of the MIG type magnetic head using fine crystal deposition type soft magnetic thin films, cores of which are Fe.

Also, after steeping the MIG magnetic heads, to which the aforesaid three kinds of soft magnetic thin film layers were applied, in a NaCl water solution of 0.5 normal concentration for one hour, the sliding surface of the magnetic recording medium was observed. As a result, the surface of the soft magnetic thin film layers of the MIG type magnetic head using fine crystal deposition type soft magnetic thin film layers the cores of which were Fe was corroded. On the contrary, there were observed no corrosions on the surfaces of the soft magnetic thin film layers 14 and 17 of the MIG type magnetic head using the layers 14 and 17 similarly to the surfaces of the MIG type magnetic head using crystalline soft magnetic thin film layers. Consequently, it was ascertained that the MIG type magnetic head using the layers 14 and 17 had high reliability.

From the aforesaid results, it is known that superior recording and reproduction characteristics and high reliability can be obtained by using the aforesaid soft magnetic thin film layers 14 and 17 to the MIG type magnetic head.

Next, there were evaluated the reproduction characteristics of the MIG type magnetic head of the aforesaid structure employing the soft magnetic laminated films 5 and 6 as the main core portion thereof composed by forming the soft magnetic thin film layers 14 and 17 expressed by composition formula of $Fe_aSi_bTa_cRu_dGa_eN_f$ and the noble metal layers 15 and 18 by turns.

The soft magnetic thin film layers 14 and 17 employed in the embodiment used a target of 74.0 atomic percent Fe, 15.0 atomic percent Si, 2.5 atomic percent Ru, 1.0 atomic percent Ga and 7.5 atomic percent Ta and were made by performing the DC magnetron sputtering of the target in an atmosphere of an argon gas including nitrogen of 10 mol percent. The noble metal layers 15 and 17 were made by using Pt and by performing the RF magnetron sputtering of the Pt in an atmosphere of an argon gas. The soft magnetic laminated films 5 and 6 were made by laminating twelve layers of the soft magnetic thin film layers 14 and 17, each layer of which has a thickness of 0.415 $\mu$m, in a state of sandwiching noble metal layers 15 and 18, each of which has a thickness of 2 nm, respectively. An hour holding heat treatment at 550° C. was made to the produced soft magnetic laminated films 5 and 6. The coercive forces Hc of the soft magnetic laminated films 5 and 6 after the holding heat treatment were 12 A/m, and their saturation magnetic flux density Bs were 1.38 T, and further their permeabilities $\mu_{Hard}$ in the directions of hard axis of magnetization of the soft magnetic thin film layers were 3,500, respectively.

Furthermore, for comparison, a further MIG type magnetic head was made. The magnetic head has a single layer of a fine crystal deposition type soft magnetic thin film layer in its main core portion in place of the soft magnetic laminated films 5 and 6. The composition of the single layer was 74.0 atomic percent Fe, 15.0 atomic percent Si, 2.5 atomic percent Ru, 1.0 atomic percent Ga and 7.5 atomic percent Ta. The thickness of the single layer was 5 $\mu$m.

Figure 13:
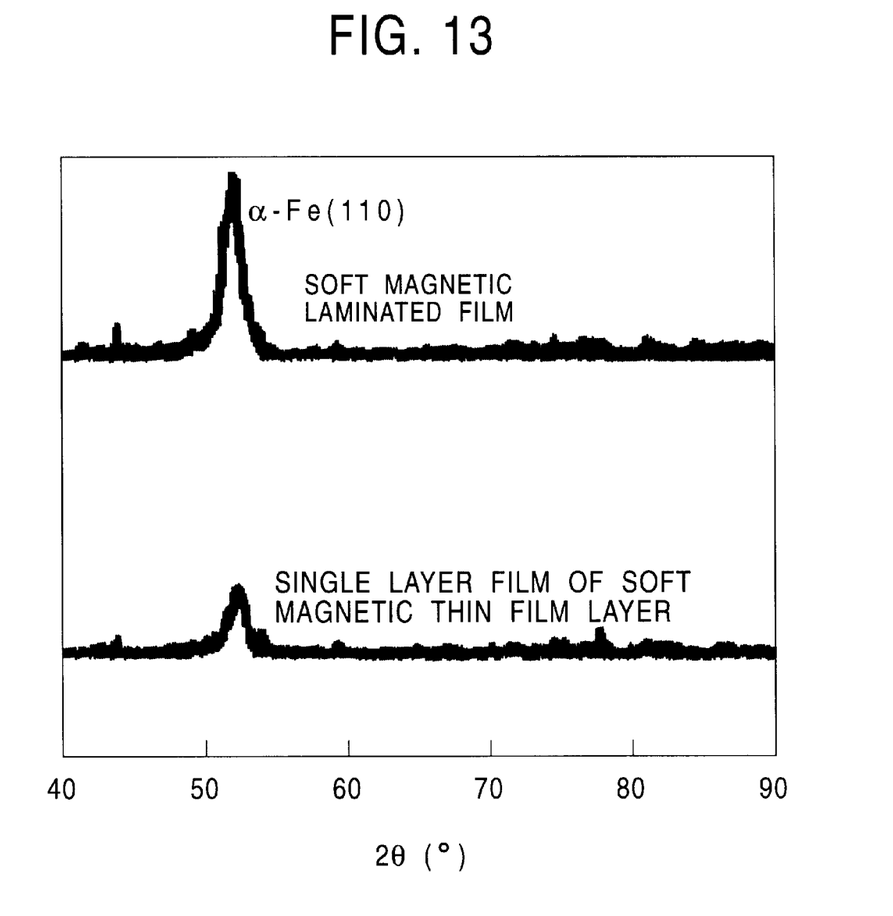
FIG. 13 is a characteristic diagram showing x-ray diffraction patterns of the soft magnetic laminated film shown in FIG. 1 and the single layer film of the soft magnetic thin film layer.
Figure 14:
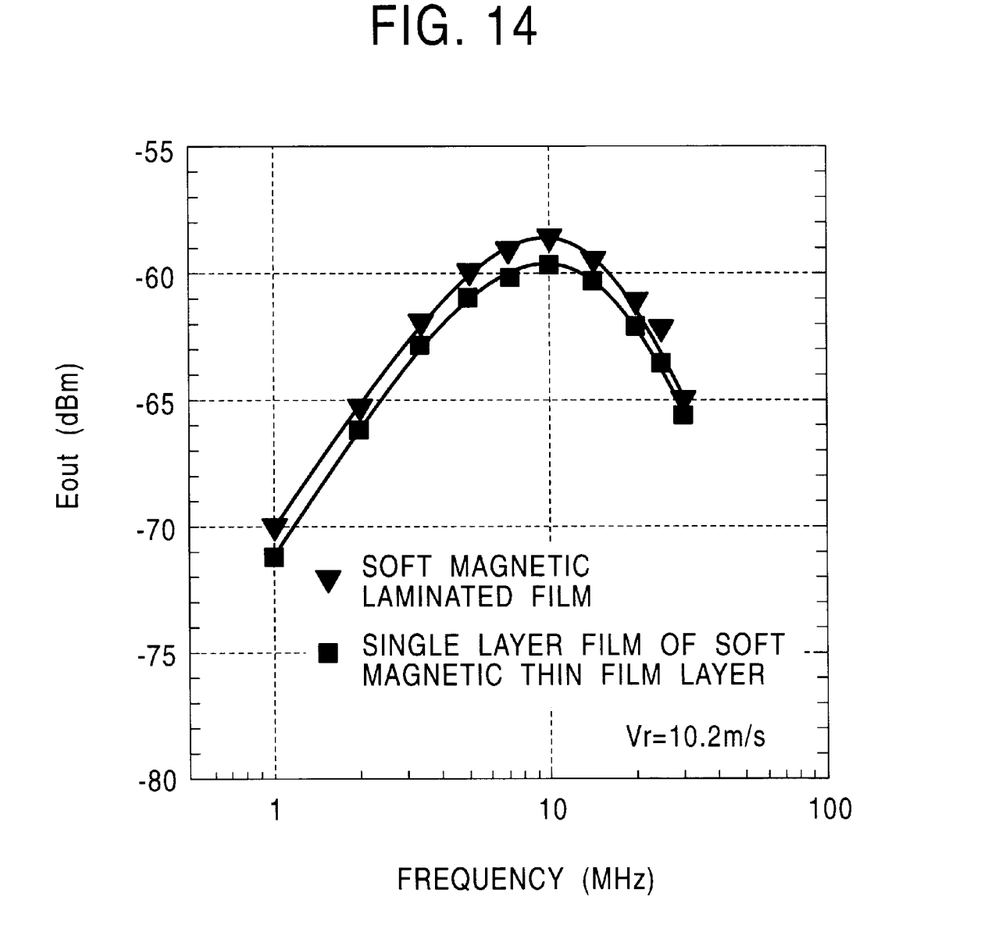
FIG. 14 is a characteristic diagram showing differences of frequency characteristics of reproduction outputs of MIG type magnetic heads using the soft magnetic laminated film shown in FIG. 1 or the single layer film of the soft magnetic thin film layer.

FIG. 13 shows x-ray diffraction patterns of the soft magnetic laminated films 5 and 6 and the single layer of the soft magnetic thin film layer. Moreover, FIG. 14 shows measurement results of frequency dependencies of reproduction outputs of the magnetic heads using the soft magnetic laminated films 5 and 6 or the single layer of the soft magnetic thin film layer as their main core portions. As a recording head, a MIG type magnetic head having a film of the composition of Fe—Ru—Ga—Si formed in parallel to the gap surface was used.

As apparent from FIG. 13, too, the α-Fe (110) orientation is strengthened in the soft magnetic laminated films made by laminating the soft magnetic thin film layers 14 and 17 and the noble metal layers 15 and 18. Moreover, as apparent from FIG. 14, it is known that the reproduction outputs of the magnetic head using the soft magnetic thin film layers 5 and 6 oriented strongly in the α-Fe (110) direction as its main core portion are improved over the whole frequency regions in comparison with those of the magnetic head using the single layer film of the soft magnetic thin film layer as its main core portion.

As the aforesaid, soft magnetic characteristics of the magnetic head having the soft magnetic laminated films 5 and 6 were improved, in particular, their permeabilities in the film thickness direction were improved and their reproduction characteristics were greatly improved.

Incidentally, the aforesaid description was given to a magnetic head in which the soft magnetic laminated films 5 and 6 were disposed in parallel to the magnetic gap "g", but the scope of the present invention is not limited to such a disposition of the laminated films 5 and 6. The present invention may be applied to, for example, a magnetic head the magnetic gap "g" of which is formed by surfaces of soft magnetic laminated films abutting to each other in which the soft magnetic laminated films are formed on inclined planes of magnetic gap forming surfaces scraped away obliquely. The present invention may also be applicable to a magnetic head having an azimuth to the magnetic gap "g". Furthermore, various modifications can be applicable to the present invention without departing from scope and the sprit thereof.

What is claimed is:

1. A magnetic head in which a pair of magnetic core half bodies are joined to each other at their opposite surfaces through a gap, and are composed of substrates which are auxiliary cores made from an oxide magnetic material, and soft magnetic laminated films, and forms a closed magnetic circuit, wherein:

the soft magnetic laminated film is made by laminating a soft magnetic thin film layer and a noble metal layer, said soft magnetic thin film layer is exhibited by a composition formula of $Fe_aSi_bTa_cRu_dGa_eN_f$ (where "a", "b", "c", "d", "e" and "f" in the formula indicate compositions of respective elements by the atomic percent), and ranges of the compositions are:

62 atomic percent<a<75 atomic percent;
7 atomic percent<b<18 atomic percent;
3 atomic percent<c<10 atomic percent;
0 atomic percent<d<10 atomic percent;
0 atomic percent<e<6 atomic percent;
5 atomic percent<f<12 atomic percent; and
b+c>13 atomic percent, and said noble metal layer contains at least a kind of Pt, Au, Ag and Pd.

2. The magnetic head according to claim 1, wherein said ranges of said compositions are:

65 atomic percent<a<70 atomic percent;
10 atomic percent<b<16 atomic percent;
5 atomic percent<c<9 atomic percent;
0 atomic percent≦d<5 atomic percent;
0 atomic percent≦e<3 atomic percent;
5 atomic percent<f<12 atomic percent; and
4.5<a/b<6.

3. The magnetic head according to claim 1, wherein said soft magnetic thin film layer contains at least a kind of Al, Cr, Ti, Co and Hf in a range of 6 atomic percent or less.

4. The magnetic head according to claim 1, wherein a thickness of a layer of said soft magnetic thin film layer is within a range of 0.05 μm to 1.0 μm.

5. The magnetic head according to claim 1, wherein a thickness of a layer of said noble metal layer is within a range of 0.3 nm to 5.0 nm.

6. The magnetic head according to claim 1, wherein a thickness of a layer of said noble metal layer is within a range of 0.3 nm to 10.0 nm.

7. A magnetic head comprising:

a magnetic core forming a closed magnetic circuit;

a gap in the closed magnetic circuit, wherein:

wherein said magnetic core comprises:

an auxiliary core comprising an oxide magnetic material; and a soft magnetic laminated film made by laminating a soft magnetic thin film layer and a noble metal layer, and wherein said soft magnetic thin film layer is exhibited by a composition formula of $Fe_aSi_bTa_cRu_dGa_eN_f$ (where "a", "b", "c", "d", "e" and "f" in the formula indicate compositions of respective elements by the atomic percent), and ranges of the compositions are:

62 atomic percent<a<75 atomic percent;
7 atomic percent<b<18 atomic percent;
3 atomic percent<c<10 atomic percent;
0 atomic percent≦d<10 atomic percent;
0 atomic percent≦e<6 atomic percent;
5 atomic percent<f<12 atomic percent; and
b+c>13 atomic percent, and said noble metal layer comprises one of Pt, Au, Ag and Pd.

8. The magnetic head according to claim 7, wherein said ranges of said compositions are:

65 atomic percent<a<70 atomic percent;
10 atomic percent<b<16 atomic percent;
5 atomic percent<c<9 atomic percent;
0 atomic percent≦d<5 atomic percent;
0 atomic percent≦e<3 atomic percent;
5 atomic percent<f<12 atomic percent; and
4.5<a/b<6.

9. The magnetic head according to claim 7, wherein said soft magnetic thin film layer contains at least a kind of Al, Cr, Ti, Co and Hf in a range of 6 atomic percent or less.

10. The magnetic head according to claim 7, wherein a thickness of a layer of said soft magnetic thin film layer is within a range of 0.05 μm to 1.0 μm.

11. The magnetic head according to claim 7, wherein a thickness of a layer of said noble metal layer is within a range of 0.3 nm to 10.0 nm.

12. The magnetic head according to claim 7, wherein a thickness of a layer of said noble metal layer is within a range of 0.3 nm to 5.0 nm.

* * * * *